July 19, 1960        W. URMAN        2,945,593

ARTICLE SUPPORTING DEVICE

Filed Oct. 26, 1954        4 Sheets-Sheet 1

INVENTOR.
WALLY URMAN
BY

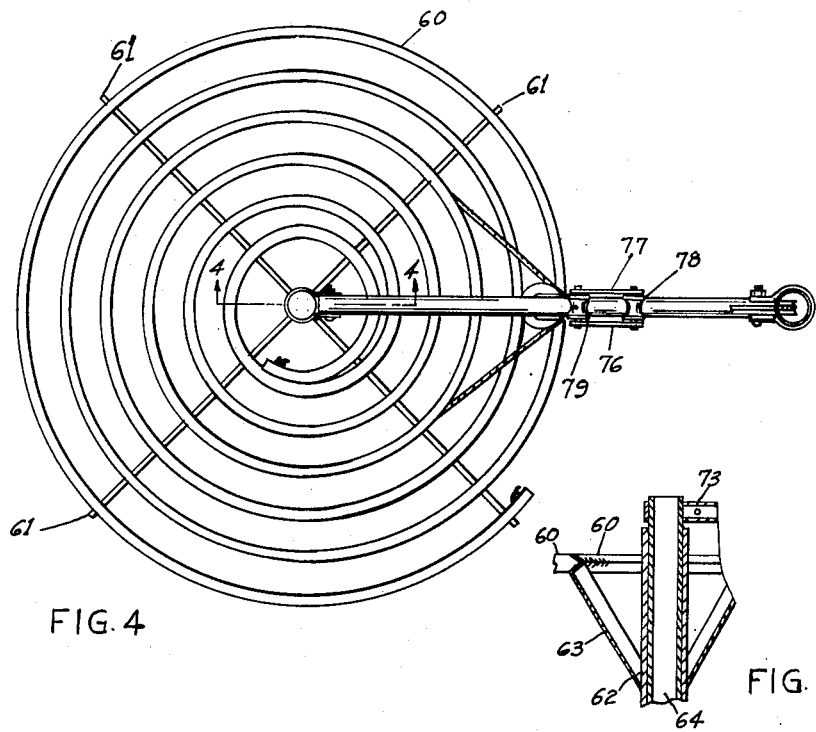
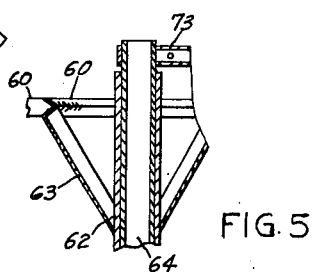
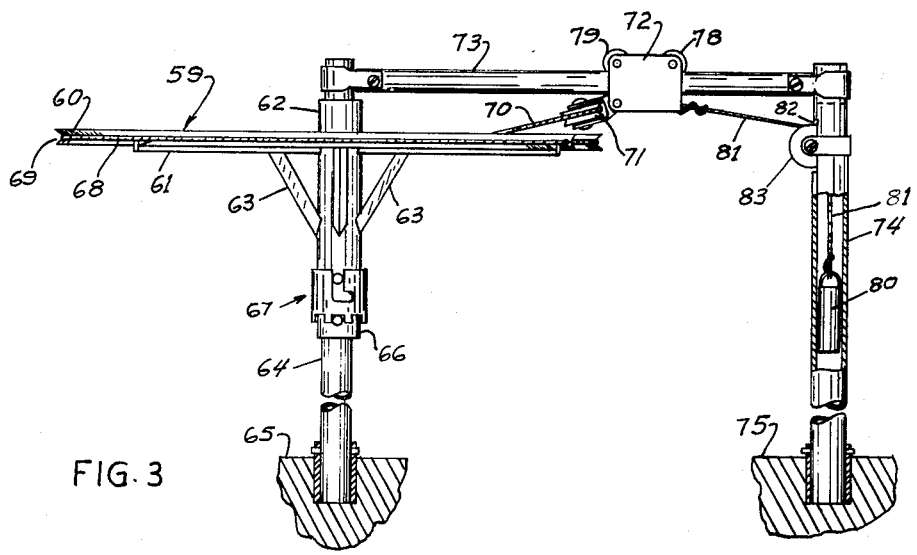

July 19, 1960 W. URMAN 2,945,593
ARTICLE SUPPORTING DEVICE
Filed Oct. 26, 1954 4 Sheets-Sheet 3

INVENTOR.
WALLY URMAN
BY

July 19, 1960   W. URMAN   2,945,593
ARTICLE SUPPORTING DEVICE
Filed Oct. 26, 1954   4 Sheets-Sheet 4

INVENTOR.
WALLY URMAN
BY

United States Patent Office 2,945,593
Patented July 19, 1960

2,945,593

ARTICLE SUPPORTING DEVICE

Wally Urman, 2633 30th St. SE., Washington, D.C.

Filed Oct. 26, 1954, Ser. No. 464,747

15 Claims. (Cl. 211—1)

This invention relates to improvements in supporting devices and more particularly to devices for supporting non-rigid, extended surface articles for processing by a fluid in which the articles are supported in drawn out or outstretched condition and in spaced relation from each other with only a small minor portion of each article being in contact with the structure of the supporting device so that a major portion of the articles are surrounded by the processing fluid.

Heretofore, supporting devices designed for supporting flexible, extended surface articles for processing by a fluid, such as by air in a drying process, in which the articles are supported in drawn out or outstretched condition and in spaced relation with respect to each other with only a minor portion of each article being in physical contact with elements of the supporting device, generally comprise a supporting structure including an elongated member upon which the articles are attached by means of manually manipulated attaching devices adapted to form a clamping connection between the articles and substantially fixed points of the elongated member. In one form the attaching devices are slidably mounted on the elongated member and include a first clamping means for securing the attaching device to a substantially fixed point of the elongated member and a second clamping means operable to supportably receive an article to be processed. In the use of this type of attaching device, the device is slid along the elongated member to a desired position thereof and the first clamping means is operated to secure the attaching device to the elongated member in that position. The second clamping means is then manually operated to supportably receive an article at one of its sides adjacent its upper end. The article is then moved to an outstretched condition laterally of the elongated member and a second attaching device is slid along the elongated member to a point coincident with the other or unattached side of the article and its first clamping means is operated to secure the attaching device onto the elongated member in that position. The second clamping means is then operated to supportably receive the article at its other side adjacent its upper end. Thus the attaching devices are required to be manually manipulated for positioning laterally of the elongated member in accordance with the outstretched dimensions of the articles to be supported, and a further manipulation is required to establish a clamping support between the articles and the attaching devices. In another form of attaching device only a single clamping operation is required. In the use of the latter type a portion of the article is wrapped or folded over the elongated member and the attaching device is clampably forced over the wrapped portion of the article in clamping relation with the underlying portion of the elongated member. The article is then drawn out and a portion of the article at its upper unsupported side is wrapped over an adjacent portion of the elongated member and another attaching device is applied to clampably secure the article to the elongated member. Both types of attaching devices require a number of manual operations in addition to positioning of the article in an outstretched condition substantially parallel to the elongated member. The first type of attaching devices described above requires a multiple clamping operation while only one clamping operation is required when using the other type. However the latter type of attaching devices have the further disadvantage in that they are only attached to the elongated member while in an actual clamping relation therewith and are therefore easily misplaced and/or lost. In addition, both of these types of attaching devices are injurious to the article being supported since the clamping force is exerted over a relatively small area of the article and is necessarily of substantial magnitude, and since relative sliding movement is usually required between the clamping members of the attaching devices and the contacting surfaces of the article being supported.

It is therefore an object of the present invention to provide a novel supporting apparatus which overcomes the disadvantages outlined above.

Another object is to provide an apparatus for supporting articles to be processed without requiring the use of article attaching devices.

Still another object of the present invention is to provide a novel apparatus for supporting non-rigid extended surface articles to be processed by a fluid by which the articles may be easily supported in an outstretched condition without requiring the use of article attaching devices.

Still another object is to provide a supporting apparatus of the foregoing type characterized so that the articles to be processed are not subject to damage and/or permanent injury during or by the supporting operation.

A still further object of the invention is to provide a novel article supporting apparatus capable of supporting a large number of articles to be processed without the use of attaching devices and by which a large number of articles may be supported on and removed from the apparatus at a single station as compared to the prior apparatuses which may require a number of stations substantially equal to the number of articles supported by the apparatus.

A still further object is to provide a rotary type of article supporting apparatus by which the articles are supportably received by merely rotating the apparatus.

A still further object is to provide a novel apparatus for supporting articles of clothing during a drying process utilizing air in which the articles of clothing may be easily supported within a relatively short period of time and in a positive manner without imparting injury or wear to the articles of clothing and without utilizing clothespins or equivalent attaching devices.

A still further object is to provide a supporting device of the foregoing character of relatively simple but rigid construction which may be easily manufactured at relatively low cost.

Other objects and features of the present invention will appear more fully below upon consideration of the following detailed description in connection with the accompanying drawings which disclose several embodiments of the invention. It is to be expressly understood, however, that the drawings are designed for purposes of illustration only and not as a definition of the limits of the invention, reference for the latter purpose being had to the appended claims.

In the drawings, in which similar reference characters denote similar elements throughout the several views:

Fig. 3 is a view in side elevation of an article supporting apparatus constructed in accordance with another embodiment of the present invention;

Fig. 4 is a plan view of the apparatus shown in Fig. 3;

Fig. 5 is a view in section taken along the line 4—4 of Fig. 4;

According to the principles of the present invention, articles are supported by means of a pair of cooperating elongated members mounted for unitary movement in a direction away from or toward a loading station where the elongated members are in spaced relation to allow an article to be inserted therebetween for clamping support upon movement of the elongated members away from the loading station. One of the elongated members is rigid while the other elongated member is flexible, and the elongated members are provided in the form of a coil structure in which the members, as a unit, are wound about themselves providing a plurality of turns. The coil structure is mounted for rotation in a horizontal plane and means are provided for rotating the coil structure so the turns are successively moved past a single loading and unloading station. The ends of the flexible member are anchored to respective ends of the rigid member and the flexible member is maintained in close contact with the rigid member throughout their respective lengths except with respect to the members forming a portion of one turn in the region of the station. The arrangement is such that upon rotation of the coil structure, the portions of the members forming the turns will successively pass the station in spaced relation. Thus articles may be inserted between the rigid member and the cooperating flexible member at the loading station, and such articles will be clamped between the members as they are rotated past the station. In particular, the present invention provides a flexible member of a length greater than the length of the rigid member, and the additional length of the flexible member is formed as a closed loop extending outwardly from spaced points on a continuous portion of the rigid member. Means are provided to maintain the flexible member under tension and in close contact with the rigid member throughout the length of the latter except for the continuous portion between the spaced points contacting the loop.

Figure 2:
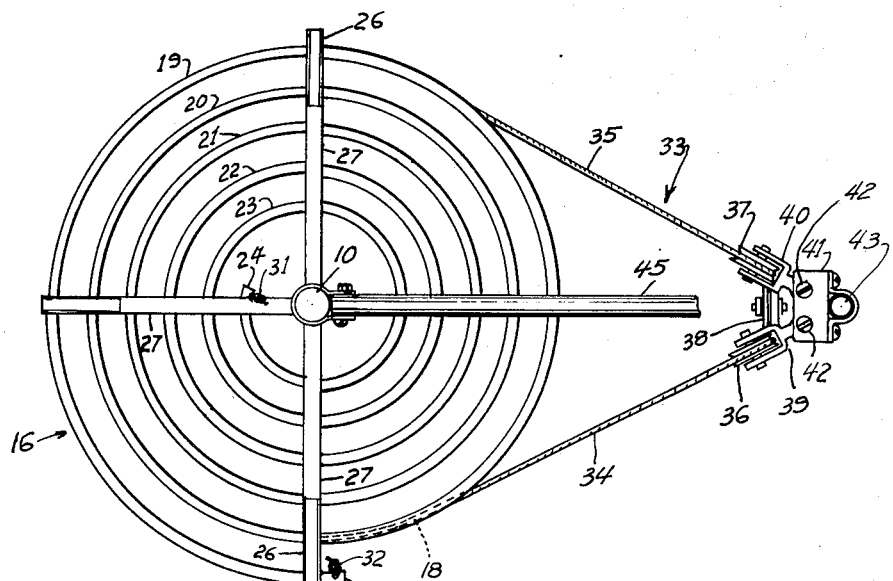
Fig. 2 is a plan view of the apparatus shown in Fig. 1.
Figure 1:
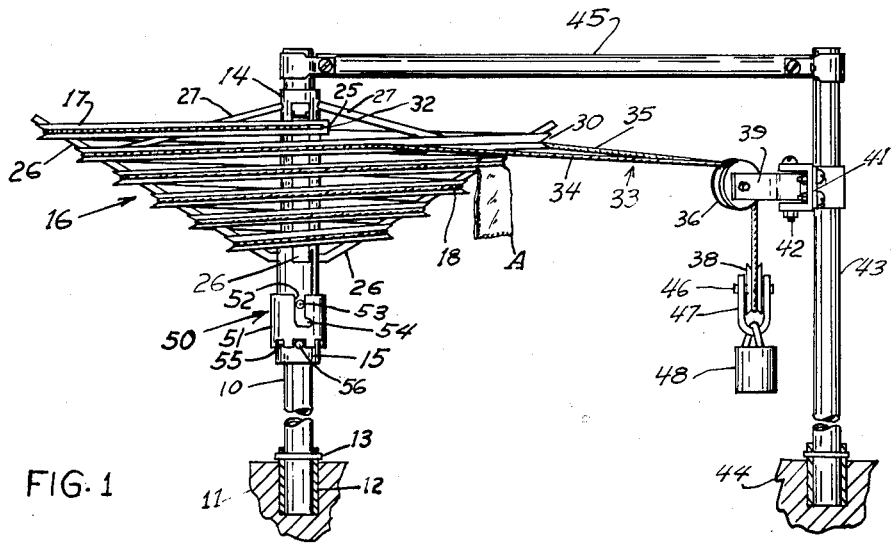
Fig. 1 is a view in side elevation illustrating an article supporting apparatus constructed in accordance with one embodiment of the present invention.

In Figs. 1 and 2 of the drawings an article supporting device constructed in accordance with one embodiment of the invention is disclosed in the environment of an apparatus for supporting articles of clothing in a drying process employing air as the drying fluid. As shown, the apparatus includes an upstanding vertically disposed columnar supporting member 10 having its lower end, as viewed in the drawing, embedded in a suitable foundation 11 by any suitable means such as a stationary sleeve 12 receiving the lower end of the supporting member 10 and a transverse pin 13 extending through the sleeve and supporting member to prevent rotation of the latter. An elongated vertically disposed sleeve 14 is rotatably mounted about the upper portion of the columnar supporting member 10, and a cylindrical flange 15, rigidly secured to the supporting member 10, contacts the lower end of the sleeve 14 and functions as a thrust bearing to support the sleeve. The elongated sleeve 14 supports a coil or supporting structure 16. The coil structure 16 includes an elongated rigid member 17 and an elongated flexible member 18. The elongated rigid member 17 is shown in the form of a coil or spiral in which the elongated member is wound about itself in spaced relationship to provide a plurality of turns 19, 20, 21, 22 and 23 with one end 24 of the elongated member comprising the beginning of the innermost turn 23 while the other end 25 of the elongated member comprises the end of the outermost turn 19. The coil structure may be formed with corresponding points on adjacent turns equally spaced from each other. Also, as the diameter of the turns decreases the height of the elongated member above the foundation may decrease so that the coil structure forms the outline of an inverted truncated cone, as shown, which may also be described as an expanded spiral structure as distinguished from a flat spiral structure incorporated in other embodiments of the invention described below. The coiled elongated rigid member 17 is supported on the tubular sleeve 14 by means of a plurality of upwardly inclined supporting members 26 having their inner lower ends rigidly secured to spaced points of the lower end of the tubular member 14 by any suitable means, and their upper ends extending outwardly at least to the large diameter turn 19. The supporting members 26 lie within the coil structure and are inclined upwardly at the proper angle to contact points on each of the turns 19, 20, 21, 22 and 23 to which they are secured by any suitable means, such as by welding. Braces 27 are connected between the outer ends of the supporting members 26 and the upper end of the tubular sleeve 14.

The coiled elongated rigid member 17 is provided with a longitudinal depression 30 for receiving the elongated flexible member 18. As shown, the elongated rigid member 17 may be of V-shaped cross section extending throughout its length and may be wound in the form of a coil with its concave surface on the outside of each of the turns presenting elongated surface means and with the valley formed by the V-shaped cross-sectional configuration providing the depression for receiving the flexible elongated member 18. One end 31 of the elongated flexible member 18 is anchored to the elongated rigid member 17 at its inner end 24, while the other end 32 of the flexible member 18 is anchored to the rigid member at its outermost end 25. The total length of the elongated flexible member 18 intermediate its ends 31 and 32 lies within the depression 30 of the rigid member 17 throughout the turns 19, 20, 21, 22 and 23 except for an arc portion of one of the turns where the flexible member 18 extends outwardly from the coil structure 16 in the form of a loop 33 received by elongated member supporting means. As shown, loop 33 includes portions 34 and 35 of the flexible member 18 which tangentially depart from spaced points on a continuous portion of the rigid member 17 and are inclined toward each other and pass over vertically disposed guide pulleys 36 and 37, respectively, and then downwardly around a single pulley 38 where the portions 34 and 35 merge together at the midpoint of the loop on the underside of the pulley 38. The pulleys 36 and 37 are rotatably mounted in yoke members 39 and 40, respectively, and the yoke members are pivotally mounted within a common U-shaped supporting member 41 by means of pivot members 42—42 for swing movement about spaced vertical axes. The support 41 is rigidly attached to an upstanding vertically disposed columnar supporting member 43 suitably embedded in a foundation 44 in any suitable manner which may be similar to the mounting arrangement of the supporting member 10. In some cases it may be desirable to connect the vertical supporting members 10 and 43 by means of a transverse member 45 connected between the upper ends of the supporting members. The pulley 38 is rotatably mounted about a horizontal pivot member 46 supported by side portions of an open-ended U-shaped bracket member 47. The bracket member 47 supports a weight 48 which functions to maintain the elongated flexible member 18 under tension for a purpose that will be described more fully below.

As described above, the elongated rigid member 17 is wound upon itself in spaced relation in the form of a coil including a plurality of turns 19, 20, 21, 22 and 23. Each of the turns may be assumed to include a portion of the elongated rigid member extending approximately 360° about the axis of rotation of the coil structure. Thus, the outer turn 19 may be considered as beginning at the end 25 of the rigid elongated member and terminating at a point disposed 360° therefrom where the second turn 20 initiates. Thus the apparatus shown in Figs. 1 and 2 includes five turns; however it is to be expressly understood that the present invention may be practiced employing a less or greater number of turns. If it is assumed that the coil structure is rotated to its maximum position in a clockwise direction, the end 32 of the elongated flexible member 18 will constitute the portion 35 of the loop 33, and the portion 34 of the loop will return into contact with the turn 19 at a point thereof displaced from its end 25 by an arcuate distance determined by the spacing between the supporting members 10 and 43. Upon rotation of the coil structure in a counterclockwise direction, the elongated flexible member 18 will rotate therewith and will be wound upon the turn 19, lying within the longitudinal depression 30, while at the same time the portion of the elongated member wound upon the opposite side of the turn 19 will leave the turn 19 and pass through the loop 33. As counterclockwise rotation of the coil structure continues, the portions of the elongated flexible member 18 wound on the turns 20, 21, 22 and 23 will leave their respective turns, pass through the loop and then re-enter the turns to be again wound thereon successively until the coil structure is rotated to its maximum position in a counterclockwise direction in which position the other end 31 of the flexible member merges into the portion 34 of the loop. Upon rotation of the coiled mechanism in a clockwise direction, an opposite action takes place with the portion of the elongated flexible member coiled on the innermost turn 31 first leaving the turn, passing through the loop and then re-entering the turn, and thereafter with a similar action taking place successively with respect to the portions of the elongated flexible member wound on the turns 22, 21, 20 and 19. When portions of the elongated flexible member wound on the turns are passing through the loop, the portions 34 and 35 of the loop will be disposed at a different angle with respect to each other, the angle increasing as the radius of the rigid member increases. For this reason the pulleys 36 and 37 are pivotally mounted so they may adjust their passes for alignment with the inclination of the portions 34 and 35 and provide for smooth, easy operation. Also, the length of the portions 34 and 35 will vary in accordance with the radius of the rigid member. Therefore, the support 41 is positioned a sufficient distance above the foundation 44 and the elongated flexible member 18 is of sufficient length to allow appreciable vertical movement of the pulley 38 and its supported weight 48 between the pulleys 36 and 37 and the the foundation.

It is desirable, especially when an article supporting mechanism embodying the principles of the present invention is provided for drying articles of clothing outdoors, to provide locking means for preventing accidental or undesirable rotation of the coil structure 16. For this purpose a locking device 50 is provided for controlling rotation of the sleeve 14 about the supporting member 10. The locking device 50 includes a sleeve member 51 slidably mounted over the bottom portion of the elongated sleeve 14 for vertical movement between fixed upper and lower positions. The sleeve 51 includes a vertical slot 52 adapted to receive a pin 53 rigidly secured to and extending outwardly from the wall of the elongated sleeve 14. At its bottom the slot 52 is provided with a lateral extension 54 adapted to receive the pin 53 upon rotation of the sleeve 51 in a clockwise direction when in its upper position, and thus lock the sleeve in the latter position. If desired a plurality of slots 52 and cooperating pins 53 may be provided. At its bottom edge the sleeve 51 is provided with a plurality of spaced openings 55 adapted to cooperate with one or a plurality of pins, such as a pin 56 secured to and extending outwardly from the bearing member 15, to establish the lower position of the sleeve and to prevent relative rotation between the supporting member 10 and the elongated sleeve 14. The locking device 50 is shown in locked position in which the pin 56 is located within one of the openings 55 and in which the pin 53 lies along the slot 52. When in locked position the distance between the pin 53 and the lateral extension 54 is greater than the depth of the openings 55 so that upon the sleeve 51 being moved upwardly and rotated to bring the pin 53 into the extension 54 the lower edge of the sleeve will lie above the pin 56 and allow relative rotation between the sleeve and the supporting member 10. It is to be expressly understood that other locking means may be utilized in place of the locking device 50, such as a friction brake arrangement, for example.

Operation of the article supporting device disclosed in Figs. 1 and 2 of the drawings will be described when employed for drying articles of clothing in which the drying fluid comprises air. It is to be expressly understood, however, that the supporting apparatus may be employed for drying other articles by means of different drying fluids or for treating articles by processes other than drying. With the apparatus in the position shown in Fig. 1, the locking device 50 is first moved to unlocked position upon moving the sleeve member 51 upwardly to its maximum position and then rotating the sleeve member in a clockwise direction to move the pin 53 into the lateral extension 54, to allow rotation of the elongated sleeve 14 relative to the supporting member 10. An article of clothing to be supported is then positioned adjacent the portion of the elongated rigid member 17 at a point thereof where the elongated flexible member leaves the rigid member and forms the portion 34 of the loop 33. The coiled mechanism is then rotated in a clockwise direction and the portion of the flexible member 18 forming the loop portion 34 is wound onto its appropriate portion of the rigid member 17 clamping the article of clothing therebetween. The article of clothing A, shown in Fig. 1, illustrates the manner in which the article of clothing is supported between the elongated members. In particular, to support an article of clothing, an upper corner of the article of clothing is either placed within the depression 30 of the rigid member or positioned between the rigid member and the flexible member and wrapped over the top of the flexible member outwardly away from the rigid member, in the region where the flexible member leaves the rigid member and merges into the portion 34 of the loop 33. The article of clothing is held in either of these positions by one hand of the operator and by use of the same hand, or by use of the operator's other hand, the coil structure is rotated in the proper direction to wind the corner of the article of clothing onto the coil structure to be clamped between the elongated members. Then the other upper end of the article is moved away from the clamped end to move the article into its outstretched condition, and the article is held in such position between the elongated members with its upper edge lying above the medial line of the depression or above the flexible member and the coil structure is further rotated in the same direction to wind the remaining portion of the article onto the coil structure between the flexible and rigid members. Successive articles of clothing may be supported in a similar manner. When it is desired to utilize the full supporting capacity of the mechanism, the elongated sleeve 14 is first rotated fully in a counterclockwise or clockwise direction before the loading operation is commenced. After the articles of clothing are loaded onto the mechanism the locking device 50 is moved to locked position, as shown in Fig. 1, until the articles of clothing are dried to the desired degree. Then the locking device 50 is moved to unlocked position and the coil structure is rotated in the opposite direction successively releasing the articles of clothing from their clamped relation between the rigid and flexible members. It will be appreciated that all the articles of clothing may be attached to the coil structure and may be removed from the coil structure without requiring the individual performing the operation to move from a small area beneath the region on one side of the coil structure where the elongated flexible member leaves contact with the elongated rigid member to form the loop. This is true even when elongated articles of clothing are being supported. In such cases it is not necessary to move the complete article or substantial portions of the article to the outstretched condition, but relatively small portions of the article may be moved to their outstretched condition and successively wrapped onto the coil structure between the elongated members.

The form of the invention shown in Figs. 3, 4 and 5 of the drawings includes a coil structure 59 comprising an elongated rigid member 60 in the form of a flat coil in which each of the turns are spaced from each other and lie in a common plane. The rigid member 60 is supported by a plurality of horizontally disposed radially extending supporting members 61 having their inner ends secured to the upper end of an elongated sleeve member 62 and an angular brace member 63 connected between each of the members 61 and the elongated sleeve 62. Details of this construction are shown more clearly in Fig. 5. The elongated sleeve 62 is rotatably supported on an upstanding vertically disposed columnar supporting member 64 anchored in a suitable foundation 65 in a manner which may be similar to the construction shown in Fig. 1. The supporting member 64 carries a sleeve bearing member 66 for supporting the elongated sleeve 62 at its lower end and a locking device 67 is provided for controlling relative rotation between the sleeve 62 and the supporting member 64; the locking device 67 may be similar to the locking device 50 shown in Fig. 1. The coil structure 59 also includes a flexible member 68 having its ends anchored to the ends of the rigid member 60 and being wound about the turns of the rigid member 60 within its longitudinal depression 69 except for a loop portion 70 which extends upwardly from the plane of the coil structure and passes over a pulley 71. The pulley 71 is pivotally supported on a carriage 72 slidably mounted on a transverse rail member 73 connected between the upper end of the supporting member 64 and the upper end of a columnar supporting member 74 which is vertically disposed and displaced from the columnar member 64; the columnar member 74 being of tubular construction and mounted in a suitable foundation 75. The carriage 72 includes a pair of side plates 76 and 77 extending downwardly on opposite sides of the transverse rail member 73. A pair of rollers 78 and 79 are rotatably mounted between the upper portions of the plates 76 and 77 and are provided with concave surfaces for cooperation with the upper side of the circular rail member 73 to support the carriage 72 for sliding movement along the rail member. The pulley 71 is pivotally connected between the lower portions of the plate members 76 and 77 beneath the rail member 73, and the carriage 72 is urged in a direction away from the supporting member 64 by means of a weight 80 mounted within the hollow supporting member 74 and connected to the carriage 72 by means of a rope 81 which enters the supporting member 74 through a slot 82 upon passing over a guide pulley 83.

In this embodiment of the invention the elongated flexible member 68 is maintained under tension by the mass of the weight 80 applied to the flexible member through the rope 81, the carriage 72 and the pulley 71, while the feature of the transversely movable carriage 72 compensates for variations in the position and size of the loop 70. The angle of the plane of the loop 70 with the horizontal plane of the coil structure 59 should be as small as possible without allowing contact between the pulley 71 and the upper portion of the elongated rigid member 60 throughout all positions of the carriage 72. The manner in which the portions of the flexible member 68 successively passed through the loop 70 upon rotation of the coil structure 59, and the manner in which the flexible and rigid members cooperate to support articles therebetween, are similar to corresponding operations described above in connection with the embodiment shown in Figs. 1 and 2.

Figure 7:
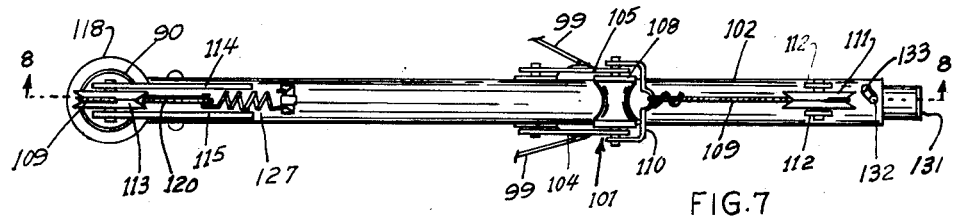
Fig. 7 is a plan view of a portion of the apparatus shown in Fig. 6.
Figure 8:
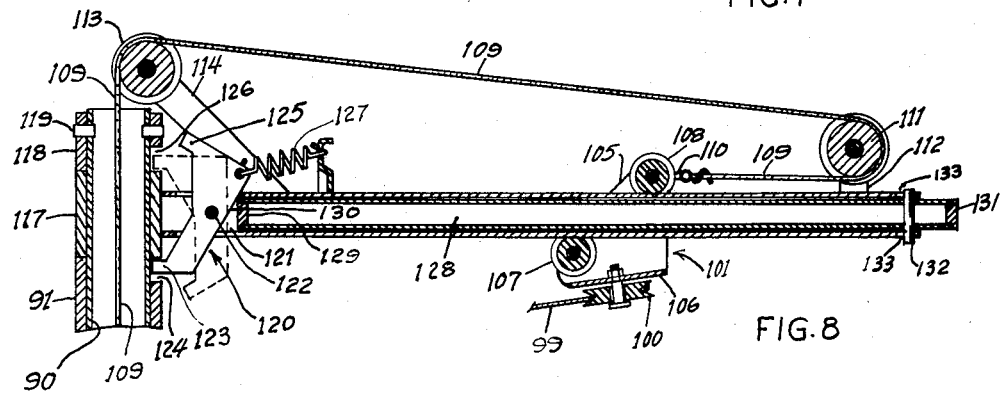
Fig. 8 is a view in section taken along the line 8—8 of Fig. 7.
Figure 6:
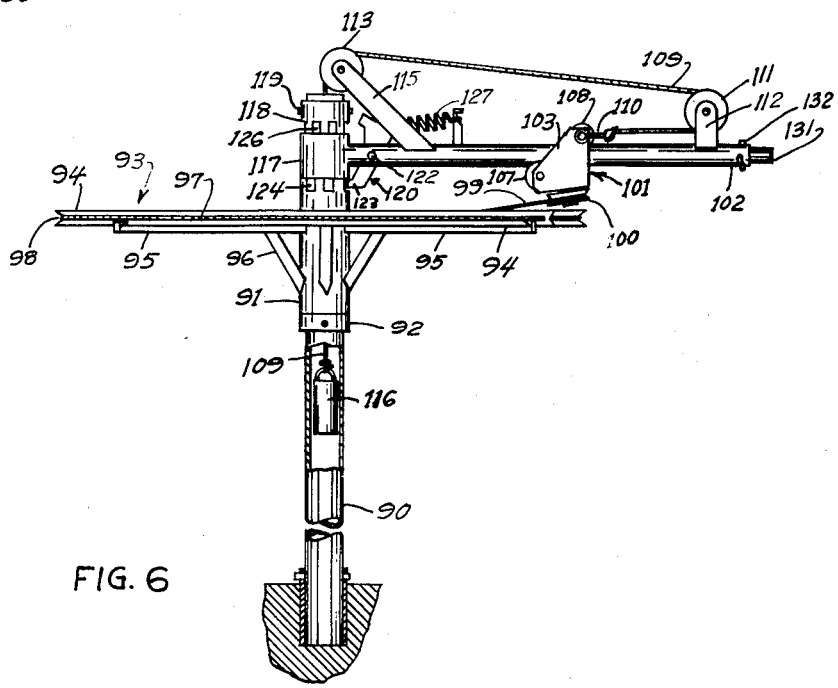
Fig. 6 is a view in side elevation of an article supporting device constructed in accordance with still another embodiment of the present invention.

The embodiment of the invention shown in Figs. 6, 7 and 8 of the drawings includes a single upstanding vertically disposed columnar supporting member 90 of tubular construction. An elongated sleeve 91 is rotatably mounted on the supporting member 90 and a sleeve member 92 is secured to the supporting member and as a supporting bearing for the elongated sleeve. The elongated sleeve supports a coil structure 93 including an elongated rigid member 94 in the form of a flat coil similar to the arrangement shown in Figs. 3 and 4. The elongated rigid member 93 is supported by means of radial, horizontally disposed members 95 and angularly disposed strut members 96 connected to the elongated sleeve. The coil structure also includes an elongated flexible member 97 located within the longitudinal depression 98 of the rigid member and wound about the turns of the rigid member throughout its length except for a looped portion 99 passing over a guide pulley 100. The pulley 100 is rotatably mounted on the underside of a carriage 101 slidably mounted on a radial arm 102 extending outwardly from the upper portion of the supporting member 90 above the coil structure 93. The carriage comprises an open-top U-shaped member 103 including spaced side portions 104 and 105 and a bottom portion 106 to which the pulley 100 is rotatably secured. The side portions 104 and 105 extend upwardly on opposite sides of the radial arm 102 and a pair of rollers 107 and 108 are rotatably mounted between the side portions below and above the radial arm 102, respectively, for mounting the carriage for longitudinal movement along the radial arm. The rollers 107 and 108 may be provided with concave surfaces for cooperation with a radial arm of circular cross section, as shown. In order to maintain the flexible member 97 under tension, one end of a cable 109 is attached to the upper end of the carriage 101 by means of a U-shaped bracket 110 and is passed around a pulley 111, rotatably mounted adjacent the unsupported end of the radial arm 102 by means of spaced supports 112. From the pulley 111 the cable is passed upwardly toward the upper end of the supporting member 90 where it passes over a pulley 113 rigidly supported in a position above the upper end of the supporting member by means of brackets 114 and 115 secured to the radial arm 102, and downwardly inside the supporting member 90 where its other end is secured to a weight 116. The action of the weight 116 urges the carriage 101 in a direction toward the unsupported end of the radial arm 102 and maintains the elongated flexible member 97 under tension. Also, the movable carriage compensates for variations in the size and position of the loop 99 as portions of the elongated flexible member are unwound and then rewound upon portions of the elongated rigid member of different radius of curvature.

As shown more clearly in Fig. 8, the supported end of the radial arm 102 is secured to a short sleeve 117 rotatably mounted about the upper end of the supporting member 90 and supported upon the upper edge of the elongated sleeve 91. A locking sleeve member 118 is positioned over the upper end of the supporting member 90 into contact with the upper end of the sleeve 117 and is secured to the supporting member by pins 119. A pawl member 120 is positioned in a vertical slot 121 in the radial arm 102 adjacent its supported end and is pivotally mounted on the radial arm by means of a pin member 122. The portion of the pawl member 120 extending below the radial arm is provided with a pawl 123 adapted upon rotation of the pawl member in a clockwise direction, to engage one of a plurality of openings 124 spatially provided about the periphery of the sleeve 91, while the portion of the member 120 extending upwardly beyond the radial arm is provided with a pawl 125 adapted, upon rotation of the pawl member in a counterclockwise direction, to contact one of a plurality of openings 126 spatially provided about the outer periphery of the locking sleeve 118. A spring 127 is attached to an upper portion of the pawl member to rotate the pawl member in a clockwise direction about the pin member 122 and normally urge the pawl 123 into contact with one of the openings 124, as shown in Fig. 8, in which position the pawl 125 is moved away from and out of contact with the openings 126 of the sleeve 118. In this position of the pawl member the radial arm 102 and the sleeve 91 and hence the coil structure 93, are rotatable in unison about the supporting member 90. For the purpose of rotating the pawl member in a counterclockwise direction to its other position, in which position the pawl 125 enters one of the openings 126 of the sleeve 118 and the pawl 123 is disengaged from an opening 124, an elongated actuating member 128 is positioned within the radial arm with one end 129 thereof being in contact with a portion 130 of the pawl member 120 passing between the walls of the radial arm and with the other end 131 extending outwardly beyond the unsupported end of the radial arm. A pin 132 is secured to the member 128 adjacent its end 131 and extends outwardly from both of its sides into slotted openings 133 provided in the walls of the radial arm. The slotted openings 133 are shaped so that upon rotation of the member 128 in one direction, the member 128 will move laterally of the radial arm in a direction toward the member 120 to cause the latter member to rotate in a counterclockwise direction against the spring 127 and move the pawl 125 into one of the openings 126. This position of the pawl member 120 is shown in broken lines in Fig. 8. When the pawl member is in the latter position, the radial arm is stationary with respect to the supporting member 90 while the coil structure may rotate relative thereto. If desired, the radial arm 102 may be nonrotatably secured to the upper end of the supporting member 90 and locking means similar to the type shown in the other embodiments may be employed for preventing or allowing relative rotation of the coil structure 93 with respect to its supporting member.

This embodiment of the invention functions to support articles in a manner similar to the arrangements previously described, but provides a more compact arrangement in that only one columnar supporting member is provided which functions as a housing for the tension producing weight. When it is desired to support or remove articles from the coil structure, the actuating member 128 is rotated to move the pawl member 120 to the position shown in broken lines in Fig. 8 in which position the radial arm is stationary and the coil structure is rotatable about the supporting member. The apparatus is locked to prevent removal of supported articles by moving the pawl member to its other position in which the radial arm and the coil structure rotate in unison.

Figure 10:
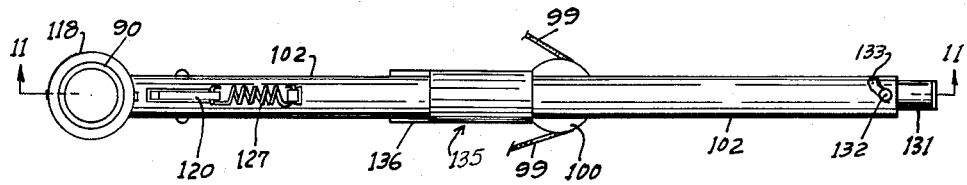
Fig. 10 is a plan view of a portion of the apparatus shown in Fig. 9.
Figure 11:
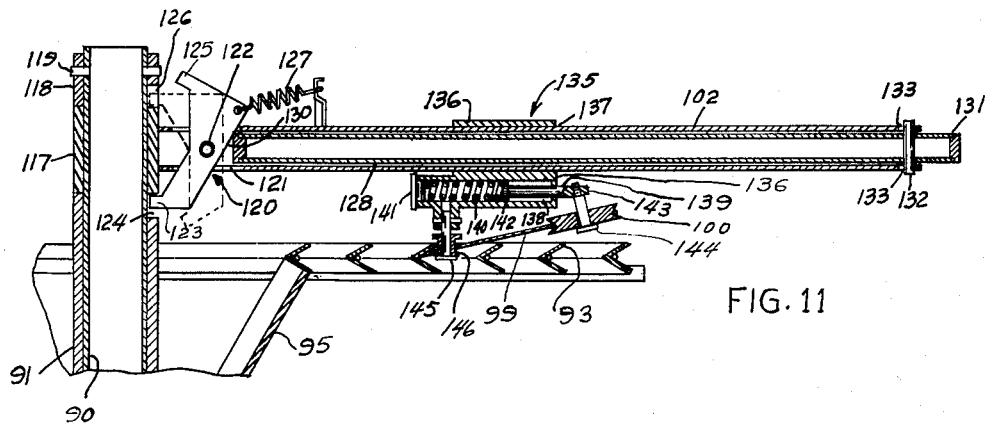
Fig. 11 is a sectional view taken along the line 11—11 of Fig. 10.
Figure 9:
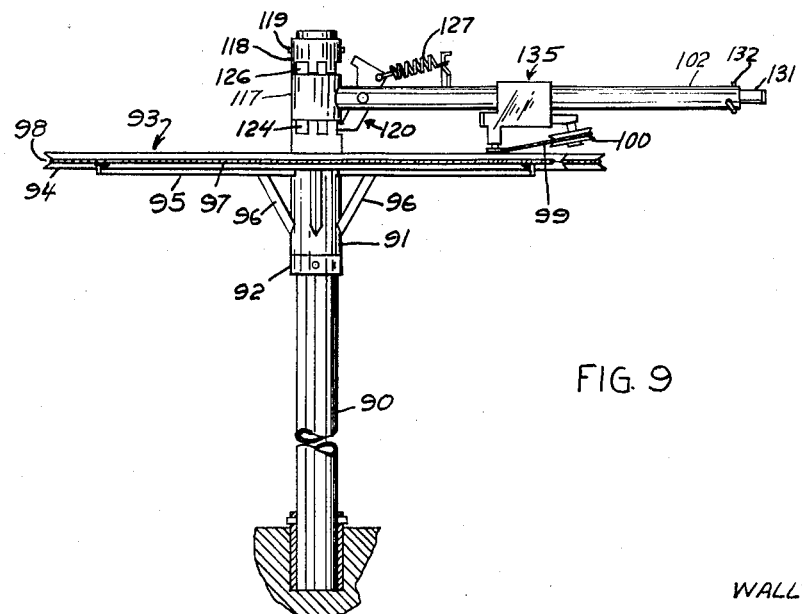
Fig. 9 is a view in side elevation of an article supporting device constructed in accordance with a still further embodiment of the invention.

The embodiment of the invention shown in Figs. 9, 10 and 11 of the drawings is similar to the article supporting apparatus shown in Figs. 6, 7 and 8 except that a different arrangement is provided for maintaining tension on the elongated flexible member 97 and for controlling the position and size of the loop portion 99 of the flexible member. The arrangement comprises a carriage 135 including a casing 136 provided with a longitudinal bore 137 in its upper portion through which the radial arm 102 passes in sliding relation therewith. In the bottom portion of the casing 136 below the radial arm a chamber 138 is provided for housing an actuating arm 139 mounted for sliding movement longitudinally of the radial arm. A coiled spring 140, under compression, is also located in the chamber 138 between a backing plate 141 and one end 142 of the arm 139 to urge the arm outwardly in a direction toward the unsupported end of the radial arm. The other end 143 of the arm 139 extends outwardly beyond the casing 136 and rotatably supports the pulley 100 by means of a pin 144. A stationary pin member 145 is secured to and depends downwardly from the lower side of the casing. The pin member 145 rotatably supports a roller 146 adapted to contact a point of the outer edge of the coiled elongated rigid member 94.

With this arrangement, the spring 140 under compression urges the roller 146 into contact with a point on the outer edge of the coiled elongated rigid member 94 so that the carriage 135 moves longitudinally of the radial arm responsively to the rotation of the coil structure. At the same time the spring 140 urges the arm 139 outwardly in a direction toward the unsupported end of the radial arm and maintains the elongated flexible member 97 under tension. Since the carriage 135 moves responsively to rotation of the coil structure, the loop portion 99 is automatically maintained in the proper size and at the proper position.

In each of the embodiments of the invention described above the elongated rigid member is shown of V-shaped cross section to provide the depressions 30, 69 and 98 for receiving the elongated flexible member. It is to be expressly understood that elongated rigid members of different cross-sectional shape may be utilized in practicing the present invention by providing other forms of depressions therein. Also, while each of the embodiments of the invention disclosed and described herein include an elongated rigid member coiled upon itself in the form of a spiral either with the turns lying in a common plane or being in the form of a truncated cone, it is within the scope of the present invention to utilize other forms of coil arrangements made up of a plurality of rigid members. For example, instead of each of the turns of the coil structure including portions having a radius of curvature, each turn may include a plurality of linear portions connected together by curved portions such as to form a substantially rectangular coil arrangement. In such an arrangement, as well as in the structures disclosed, the rigid members may be made up of sections connected together in end-to-end relation to form a continuous surface for receiving the flexible member. In addition, the flexible member employed by the present invention may comprise a rope or cord made of fiber, metal, or plastic material. Also, tension producing means other than weights may be employed. For example, the weights 48, 80 and 116 shown in Figs. 1, 3 and 6 may be replaced with coil springs under tension having one end stationary and the other end connected to the bracket 47, or the ropes 81 and 109, respectively. The term "elongated member supporting means" as used herein refers to the structure which functions to support the loop portion of the elongated flexible member in spaced relation with the core or supporting structure for the elongated flexible member.

Although several embodiments of the present invention have been disclosed and described herein it is to be expressly understood that various changes and substitutions may be made therein without departing from the spirit of the invention as well understood by those skilled

What is claimed is:

1. A device adapted for use in supporting articles comprising supporting structure including a plurality of spaced curved portions in the form of a coil presenting elongated surface means on the outer peripheral surface of the curved portions, the elongated surface means including means adapted to receive an elongated flexible member, a continuous elongated flexible member having a length greater than the distance measured along the coil between the curved portions at the opposite ends of the coil, the curved portion at one end of the coil including means adapted to anchor one end of the elongated flexible member to the supporting structure, the curved portion at the other end of the coil including means adapted to anchor the other end of the elongated flexible member to the supporting structure, flexible member supporting means adapted to receive an intermediate portion of the elongated flexible member, means for mounting the flexible member supporting means in spaced relation with respect to the supporting structure, means for moving the flexible member supporting means for movement in a plane substantially perpendicular to the axis of the coil and spaced from the supporting means, and means for urging the flexible member supporting means in a direction away from the axis of the coil so that the elongated flexible member is maintained in clamping relation with the elongated surface means.

2. A device adapted for use in supporting articles comprising supporting structure including a plurality of spaced curved portions arranged in the form of a spiral, the spaced curved portions presenting elongated surface means on the outer peripheral surfaces of the curved portions, the elongated surface means including means adapted to receive an elongated flexible member, a continuous elongated flexible member of a length greater than the length of the elongated surface means, the curved portion at the inner end of the spiral including means adapted to support one end of the elongated flexible member and the curved portion at the outer end of the spiral including means adapted to support the other end of the elongated flexible member, flexible member supporting means adapted to support an intermediate loop portion of the flexible member, means for mounting the flexible member supporting means in spaced relation with respect to elongated surface means, means for moving the flexible member supporting means relative to the supporting structure, means for rotatably mounting the supporting structure relative to the flexible member supporting means so that the intermediate loop portion of the elongated flexible member moves relative to the flexible member supporting means upon rotation of the supporting means, means associated with the flexible member supporting means to compensate for changes in size of the intermediate loop portion upon rotation of the supporting means, and means for maintaining the elongated flexible member under tension and in clamping relation with the elongated surface means of the curved portions.

3. A device adapted for use in supporting articles as defined in claim 1 in which the plurality of spaced curved portions are in the form of an expanded spiral with the outer peripheral surfaces lying within an inverted truncated conical envelope.

4. A device adapted for use in supporting articles comprising an elongated rigid member in the form of a spiral including a plurality of spaced curved portions, one end of the elongated rigid member corresponding to the inner end of the spiral and the other end of the elongated rigid member corresponding to the outer end of the spiral, the outer peripheral surface of the curved portions of the elongated member including means adapted to receive an elongated flexible member, a continuous elongated flexible member having a length greater than the peripheral length of the curved portions of the elongated member, the one end and the other end of the elongated rigid member including means for attachably receiving the ends of the elongated flexible member, flexible member supporting means adapted to support an intermediate loop portion of the elongated flexible member, means for mounting the flexible member supporting means in spaced relation with a curved portion of the elongated rigid member, means for rotatably mounting the elongated rigid member relative to the flexible member supporting means so that different portions of the elongated flexible member successively comprise intermediate loop portion supported by the flexible member supporting means, means for moving the flexible member supporting means radially of the spiral responsively to rotation of the elongated member, and means associated with the flexible member supporting means for maintaining the elongated flexible member under tension in clamping relation with the outer peripheral surface of the curved portions.

5. A device adapted for use in supporting articles comprising a vertical supporting member, an elongated rigid member in the form of a spiral including a plurality of spaced curved portions, one end of the elongated rigid member corresponding to the inner end of the spiral and the other end of the elongated rigid member corresponding to the outer end of the spiral, means for rotatably mounting the elongated rigid member on the vertical supporting member about the longitudinal axis of the spiral, the outer peripheral surface of the curved portions of the elongated rigid member including means providing a longitudinal depression extending throughout the length of the elongated rigid member and adapted to receive an elongated flexible member, a continuous elongated flexible member of a length greater than the total peripheral length of the curved portions of the elongated rigid member, the one end and the other end of the elongated rigid member including means for attachably receiving the ends of the elongated flexible member, flexible member supporting means adapted to support an intermediate loop of the elongated flexible member, means for mounting the flexible member supporting means in spaced relation with a curved portion of the elongated rigid member so that different portions of the elongated flexible member successively comprise the loop supported by the flexible member supporting means upon rotation of the elongated rigid member about the vertical supporting member, means for moving the flexible member supporting means to compensate for variations in the size of the loop responsively to rotation of the elongated rigid member, and means for maintaining the elongated flexible member under tension and thus in clamping relation with the longitudinal depression of the curved portions of the elongated rigid member.

6. A device adapted for use in supporting articles as defined in claim 5 in which the flexible member supporting means includes a carriage and means for mounting the carriage for movement radially of the vertical supporting member and in which means are provided for urging the flexible member supporting means in a direction away from the vertical supporting member to maintain the elongated flexible member under tension and in clamping relation with the longitudinal depression of the curved portion of the elongated rigid member.

7. A device adapted for use in supporting articles as defined in claim 6 in which locking means are provided for preventing rotation of the elongated rigid member relative to the vertical supporting member.

8. A device adapted for use in supporting articles comprising a vertical supporting member, an elongated rigid member in the form of a spiral including a plurality of spaced curved portions, means for mounting the elongated rigid member for rotation about the vertical supporting member, the outer peripheral surface of the curved portions of the elongated rigid member including means providing a longitudinal depression in the elongated rigid member adapted to receive an elongated flexible member, a continuous elongated flexible member of a length greater than the total peripheral length of the curved portions of the elongated rigid member, a radial supporting arm extending outwardly from the vertical supporting member in spaced relation with the elongated rigid member, a carriage slidably mounted on the radial arm, pulley means carried by the carriage and adapted to support a loop of the elongated flexible member in spaced relation with a curved portion of the elongated rigid member, and means for urging the carriage in a direction away from the vertical supporting means to maintain the elongated flexible member under tension and in clamping relation with the longitudinal depression in the curved portions of the elongated rigid member, the last-named means allowing movement of the carriage along the radial arm responsively to rotation of the elongated rigid member.

9. A device adapted for use in supporting articles as defined in claim 8 in which the means for urging the carriage in a direction away from the vertical supporting member is supported by the vertical supporting member.

10. A device adapted for use in supporting articles as defined in claim 8 in which the carriage includes means cooperating with the curved portions of the elongated rigid member for moving the carriage radially of the vertical supporting means responsively to rotation of the elongated rigid member and resilient means for urging the pulley means in a direction away from the vertical supporting member.

11. An article supporting device comprising a supporting member including a plurality of spaced curved portions in the form of a coil presenting an elongated surface means on the outer peripheral surface of the curved portions, the elongated surface means including elongated recess means, means for mounting the supporting member for rotation about an axis perpendicular to the coil, an elongated flexible member having a length greater than the length of the elongated surface means, means for attaching one end of the elongated flexible member to the curved portion at one end of the coil, means for attaching the other end of the elongated flexible member to the curved portion at the other end of the coil, the portion of the elongated flexible member intermediate its one end and its other end lying in the elongated recess means except for a portion of the elongated flexible member extending outwardly from one of the curved portions in the form of a loop, loop supporting means for supporting the loop, a support for the loop supporting means spaced from the axis of the coil, means for mounting the loop supporting means on the support for movement relative to the supporting member, the loop supporting means being located in a plane displaced from the coil so that the loop portion of the flexible member lies in a plane disposed at an angle with respect to the coil, and means for urging the loop supporting means in a direction away from the coil.

12. An article supporting device comprising a vertical supporting member, an elongated rigid member in the form of a spiral including a plurality of spaced curved portions, one end of the elongated rigid member corresponding to the inner end of the spiral and the other end of the elongated rigid member corresponding to the outer end of the spiral, means for rotatably mounting the elongated rigid member on the vertical supporting member about the longitudinal axis of the spiral, the outer peripheral surface of the curved portions of the elongated rigid member including means providing a longitudinal depression extending throughout the length of the elongated rigid member, an elongated flexible member of a length greater than the total peripheral length of the curved portions of the elongated rigid member, means for attaching one end of the elongated flexible member to the curved portion at one end of the coil, means for attaching the other end of the elongated flexible member to the curved portion at the other end of the coil, the portion of the elongated flexible member intermediate its one end and its other end lying in the longitudinal depression except for a portion of the elongated flexible member extending outwardly from one of the curved portions in the form of a loop, loop supporting means mounted in spaced non-rotatable relation with respect to the elongated rigid member for supporting the loop in spaced relation with the elongated rigid member for relative movement therewith so that different portions of the elongated flexible member successively comprise the loop upon rotation of the elongated rigid member about the vertical supporting member, means for moving the loop supporting means to compensate for variations in the size of the loop responsively to rotation of the elongated rigid member, and means for maintaining the elongated flexible member under tension and thus in clamping relation with the longitudinal depression of the curved portions of the elongated rigid member.

13. An article supporting device comprising supporting structure including a plurality of spaced curved portions in the form of a coil presenting elongated surface means on the outer peripheral surface of the curved portions, the elongated surface means including receiving means adapted to receive an elongated flexible member, an elongated flexible member having a length greater than the length of the elongated surface means and having opposite ends joined to the supporting structure adjacent opposite ends of the elongated surface means, supporting means adapted to receive an intermediate portion of the elongated flexible member, and means maintaining the intermediate portion of the elongated flexible member in spaced relation with the supporting structure and non-intermediate portions of the elongated flexible member in contact with receiving means of the elongated surface means, the last-named means including means for mounting the supporting means in spaced relation with the supporting structure.

14. An article supporting device comprising supporting structure including a plurality of spaced curved portions in the form of a coil presenting elongated surface means on the outer peripheral surface of the curved portions, the elongated surface means including receiving means adapted to receive an elongated flexible member, an elongated flexible member having a length greater than the length of the elongated surface means and having opposite ends joined to the supporting structure adjacent opposite ends of the elongated surface means, supporting means adapted to receive an intermediate portion of the elongated flexible member, means for rotatably mounting the supporting structure relative to the supporting means, and means maintaining the intermediate portion of the elongated flexible member in spaced relation with the supporting structure and non-intermediate portions of the elongated flexible member in contact with receiving means of the elongated surface means, the last-named means including means for mounting the supporting means in spaced relation with the supporting structure.

15. Device adapted for use in supporting articles comprising supporting structure including a plurality of spaced curved portions in the form of a coil presenting elongated surface means on the outer peripheral surfaces of the curved portions, the elongated surface means including means adapted to receive an elongated flexible member, an elongated flexible member having a length greater than the distance measured along the coil between the curved portions at the opposite ends of the coil, the curved portion at one end of the coil including means adapted to anchor one end of the elongated flexible member to the supporting structure, the curved portion at the other end of the coil including means adapted to anchor the other end of the elongated flexible member to the supporting structure, supporting means adapted to receive an intermediate portion of the elongated flexible member, means for mounting the supporting means in spaced relation with the supporting structure to maintain the intermediate portion of the elongated flexible member in spaced relation with respect to the supporting structure, and means for urging the supporting means in a direction to maintain the elongated flexible member in clamping relation with the curved portions.

References Cited in the file of this patent

UNITED STATES PATENTS

| | | |
|---|---|---|
| 34,802 | Boyers | Mar. 25, 1862 |
| 1,047,273 | Morris | Dec. 17, 1912 |
| 1,408,463 | Miles | Mar. 7, 1922 |
| 1,437,987 | Miller | Dec. 5, 1922 |
| 1,836,173 | Jones | Dec. 15, 1931 |
| 1,874,077 | Anderson | Aug. 30, 1932 |
| 2,056,481 | Pauli | Oct. 6, 1936 |
| 2,088,638 | Davies | Aug. 3, 1937 |